United States Patent
Suenaga

(10) Patent No.: US 10,085,107 B2
(45) Date of Patent: Sep. 25, 2018

(54) SOUND SIGNAL REPRODUCTION DEVICE, SOUND SIGNAL REPRODUCTION METHOD, PROGRAM, AND RECORDING MEDIUM

(71) Applicant: SHARP KABUSHIKI KAISHA, Sakai, Osaka (JP)

(72) Inventor: Takeaki Suenaga, Sakai (JP)

(73) Assignee: SHARP KABUSHIKI KAISHA, Sakai, Osaka (JP)

( * ) Notice: Subject to any disclaimer, the term of this patent is extended or adjusted under 35 U.S.C. 154(b) by 0 days.

(21) Appl. No.: 15/555,068

(22) PCT Filed: Feb. 16, 2016

(86) PCT No.: PCT/JP2016/054480
§ 371 (c)(1),
(2) Date: Aug. 31, 2017

(87) PCT Pub. No.: WO2016/140058
PCT Pub. Date: Sep. 9, 2016

(65) Prior Publication Data
US 2018/0048978 A1    Feb. 15, 2018

(30) Foreign Application Priority Data

Mar. 4, 2015  (JP) ................. 2015-043003

(51) Int. Cl.
*H04S 7/00* (2006.01)
*H04R 5/00* (2006.01)
(Continued)

(52) U.S. Cl.
CPC .............. *H04S 7/303* (2013.01); *G06F 3/012* (2013.01); *H04S 3/008* (2013.01); *H04S 2400/01* (2013.01); *H04S 2400/11* (2013.01)

(58) Field of Classification Search
CPC ............ H04S 2420/01; H04S 2420/11; H04S 2400/11; H04S 7/30; H04S 7/301;
(Continued)

(56) References Cited

U.S. PATENT DOCUMENTS 5,796,843 A *  8/1998  Inananga ................. H04S 3/004
                                                    381/17
2006/0056639 A1 *  3/2006  Ballas ..................... H04S 1/005
                                                    381/17

(Continued)

FOREIGN PATENT DOCUMENTS

JP    2006-209144 A    8/2006
JP    2008-151766 A    7/2008
WO    2012/120810 A1   9/2012

*Primary Examiner* — Thang Tran
(74) *Attorney, Agent, or Firm* — ScienBiziP, P.C.

(57) ABSTRACT

A virtual sound source position determination unit (122) determines a position of the virtual sound source from which a sound represented by a sound signal is output based on a detected motion of a user (31). A sound signal processing unit (123) performs stereophonic sound processing on the sound signal based on the determined position of the virtual sound source. The sound signal processing unit (123) reproduces the sound signal subjected to the stereophonic sound processing. Thus, the sound signal is reproduced such that the sound suitable for the motion of the user is output.

5 Claims, 10 Drawing Sheets

(51) Int. Cl.
*H04S 3/00* (2006.01)
*G06F 3/01* (2006.01)

(58) Field of Classification Search
CPC .......... H04S 7/032; H04S 7/303; H04S 7/304; G06F 3/012; H04R 3/00; H04R 5/00
See application file for complete search history.

(56) References Cited

U.S. PATENT DOCUMENTS

| | | | | |
|---|---|---|---|---|
| 2006/0062410 | A1* | 3/2006 | Kim | H04S 7/302 381/310 |
| 2008/0118074 | A1 | 5/2008 | Takada et al. | |
| 2009/0034766 | A1* | 2/2009 | Hamanaka | H04R 3/12 381/310 |
| 2009/0310802 | A1* | 12/2009 | Zhang | H04S 7/302 381/300 |
| 2010/0080396 | A1* | 4/2010 | Aoyagi | H04S 1/005 381/17 |
| 2011/0222693 | A1* | 9/2011 | Lee | H03G 9/005 381/17 |
| 2012/0020502 | A1* | 1/2012 | Adams | H04S 7/304 381/310 |
| 2012/0093320 | A1* | 4/2012 | Flaks | H04S 7/301 381/17 |
| 2012/0219165 | A1* | 8/2012 | Yamada | H04R 1/1091 381/310 |
| 2013/0156201 | A1 | 6/2013 | Nakai | |
| 2014/0126758 | A1* | 5/2014 | Van Der Wijst | H04S 7/304 381/310 |
| 2014/0300636 | A1* | 10/2014 | Miyazaya | H04R 5/033 345/633 |
| 2014/0321680 | A1* | 10/2014 | Takahashi | H04S 7/304 381/303 |
| 2015/0230040 | A1* | 8/2015 | Squires | H04S 7/306 381/303 |
| 2017/0070838 | A1* | 3/2017 | Helwani | H04S 5/005 |

* cited by examiner

| SOUND SOURCE NUMBER | ALLOWABILITY OF POSITION CHANGE |
|---|---|
| 1 | ALLOW |
| 2 | PROHIBIT |
| 3 | ALLOW |

(b)

| SOUND SOURCE NUMBER | PRIORITY (WHEN STATIONARY) | PRIORITY (WHEN MOVING) |
|---|---|---|
| 1 | HIGH | LOW |
| 2 | LOW | HIGH |
| 3 | HIGH | LOW |

(c)

| SOUND SOURCE NUMBER | POSITION (WHEN STATIONARY) | POSITION (WHEN MOVING) |
|---|---|---|
| 1 | $(r1, \theta1)$ | $(r2, \theta1)$ |
| 2 | $(r2, \theta2)$ | $(r1, \theta2)$ |
| 3 | $(r1, \theta3)$ | $(r2, \theta3)$ |

SOUND SIGNAL REPRODUCTION DEVICE, SOUND SIGNAL REPRODUCTION METHOD, PROGRAM, AND RECORDING MEDIUM

TECHNICAL FIELD

The present invention relates to a sound signal reproduction device and a sound signal reproduction method for reproducing a sound signal. Furthermore, the present invention also relates to a program for causing a computer to operate as the sound signal reproduction device and a recording medium in which such program is recorded.

BACKGROUND ART

In recent years, with the spread of information terminals for individuals represented by smartphones and the like, an amount of information in which each individual receives is increasing. In such information terminals, a plurality of applications usually operate in an asynchronous manner to transmit information irregularly and frequently.

The information transmitted from the information terminal itself or the application executed in the information terminal includes visual information such as image information or character information. In such cases, the image information or the character information is provided to a user by being displayed as images or characters on a display provided in the main body of the information terminal or an external display terminal connected to the information terminal. PTL 1 discloses an eyeglass-type image information display terminal as an example of such information terminal.

However, in the image information display terminal that displays transmitted notification information as an image disclosed in PTL 1, there is a problem that a certain labor occurs for a user, such as necessity of interrupting work which has been performed just before, in order for the user to gaze at an image displayed on an image display unit such as a display.

On the other hand, the information transmitted from the information terminal or the application also includes an auditory situation such as sound information. In such case, the sound information is provided to a user by being output as sound in a stereo form, a stereophonic sound form, or the like through a speaker provided in the information terminal, or a headphone or an earphone connected to the information terminal. Therefore, it is considered that notification of information to the user is performed not by displaying the images or the characters, but by outputting the sound in order to avoid the interruption of the work of the user. PTL 2 discloses a stereophonic sound control device that provides an indication of a direction to a listener with a sound.

CITATION LIST

Patent Literature

PTL 1: Japanese Unexamined Patent Application Publication No. 2006-209144 (published 20 Mar. 2006)
PTL 2: Japanese Unexamined Patent Application Publication No. 2008-151766 (published 8 Jul. 2008)

SUMMARY OF INVENTION

Technical Problem

However, in the device operated in PTL 2, an action of a user is not considered when presenting information to the user by a sound signal. Accordingly, there may be a problem of disturbing the action of the user by presenting the user with the sound that does not match the action of the user.

The present invention has been made to solve above problems. The object is to provide a sound signal reproduction device, a sound signal reproduction method, a program, and a recording medium for reproducing a sound signal such that a sound suitable for a motion of a user is output.

Solution to Problem

In order to solve the above-mentioned problems, a sound signal reproduction device according to an aspect of the present invention includes an acquisition unit that acquires a sound signal indicating a sound; a detection unit that detects a motion of a user; a determination unit that determines a position of a virtual sound source from which the sound represented by the acquired sound signal is output based on the detected motion; a processing unit that performs stereophonic sound processing according to the determined position of the virtual sound source on the acquired sound signal; and a reproduction unit that reproduces the sound signal subjected to the stereophonic sound processing.

In order to solve the above-mentioned problems, a sound signal reproduction method according to an aspect of the present invention includes an acquisition process of acquiring a sound signal indicating a sound; a detection process of detecting a motion of a user; a determination process of determining a position of a virtual sound source from which the sound represented by the acquired sound signal is output based on the detected motion of the user; a processing process of performing stereophonic sound processing according to the determined position of the virtual sound source on the acquired sound signal; and a reproduction process of reproducing the sound signal subjected to the stereophonic sound processing.

Advantageous Effects of Invention

According to an aspect of the present invention, it is possible to reproduce a sound signal such that a sound suitable for a motion of a user is output.

BRIEF DESCRIPTION OF DRAWINGS

FIG. 9(c) is a diagram illustrating still another example of positions of the plurality of the virtual sound sources when the user is gazing at the gaze area according to the first embodiment of the present invention.

FIGS. 11(a) to (c) are diagrams illustrating examples of metadata according to the second embodiment of the present invention.

DESCRIPTION OF EMBODIMENTS

Each embodiment according to the present invention will be described in detail below. The scope of the present invention is not limited to configurations described in the embodiments unless otherwise specified.

First Embodiment

A first embodiment of the present invention will be described below with reference to FIGS. 1 to 9.

A sound signal reproduction device 1 according to the first embodiment of the present invention acquires at least one sound signal and detects a motion of a user of the sound signal reproduction device 1. Based on the detected motion of the user, the acquired sound signal is virtually disposed at a position based on an arbitrary rule set in advance. Then, each sound signal is converted into a sound signal of a stereophonic sound scheme based on the disposed virtual position of the sound signal, and the converted sound signal is reproduced.

Figure 1:
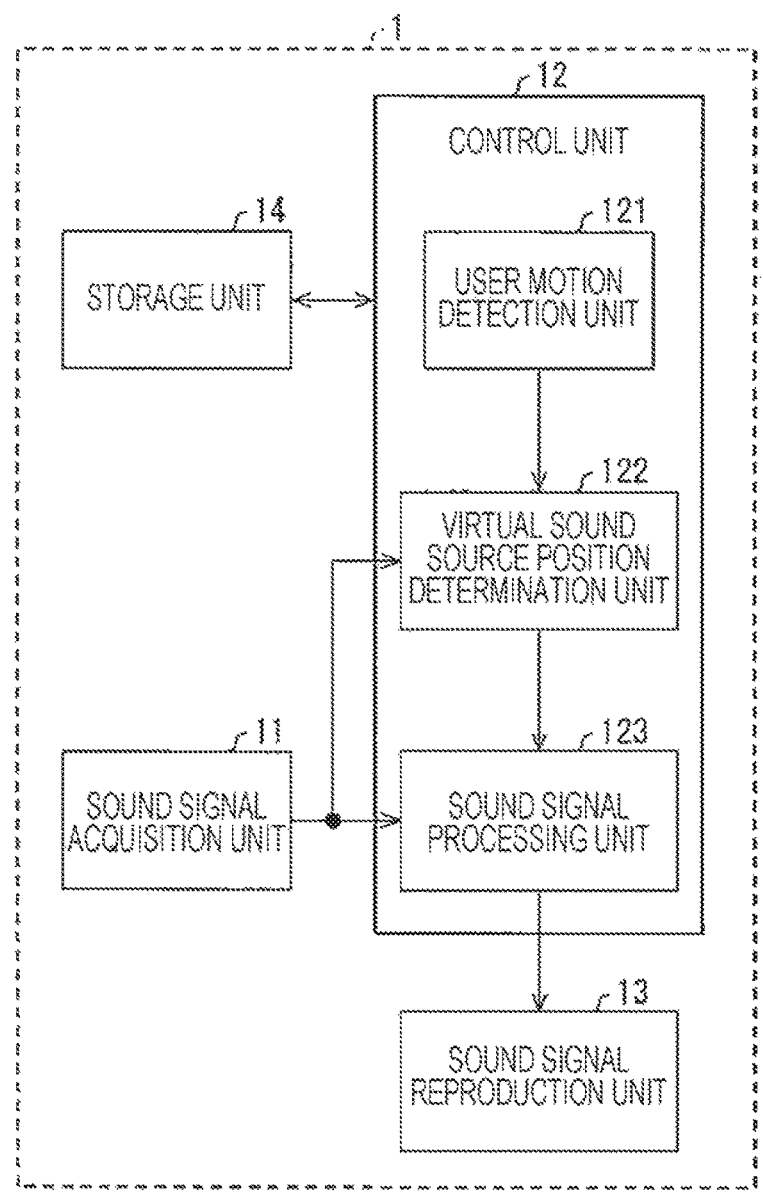
FIG. 1 is a block diagram illustrating a configuration of main parts of a sound signal reproduction device according to a first embodiment of the present invention.

The sound signal reproduction device 1 according to the embodiment will be described with reference to FIG. 1. FIG. 1 is a block diagram illustrating a configuration of main parts of the sound signal reproduction device 1 according to the first embodiment of the present invention. As illustrated in the figure, the sound signal reproduction device 1 includes a sound signal acquisition unit 11 (acquisition unit), a control unit 12, a sound signal reproduction unit 13 (reproduction unit), and a storage unit 14. Further, the control unit 12 includes a user motion detection unit 121 (detection unit), a virtual sound source position determination unit 122 (determination unit), and a sound signal processing unit 123 (processing unit).

The sound signal acquisition unit 11 acquires at least one sound signal from the outside of the sound signal reproduction device 1. The sound signal may be either a stereo form or a monaural form. The sound signal acquisition unit 11 can also acquire a sound signal of a form in which a plurality of sound signals are interleaved. In such case, the sound signal acquisition unit 11 deinterleaves the acquired sound signal into a plurality of monaural sound signals.

The control unit 12 controls the sound signal acquisition unit 11, the sound signal reproduction unit 13, and the storage unit 14, and inputs and outputs data to and from these members. The control unit 12 is realized, for example, by causing a Central Processing Unit (CPU) to execute a program stored in a predetermined memory.

The sound signal reproduction unit 13 reproduces each sound signal subjected to stereophonic sound processing (sound effect processing) by the control unit 12 to output the sound through an earphone 24.

The storage unit 14 is configured to include a secondary storage device for storing predetermined data used by the control unit 12. The storage unit 14 is realized, for example, as a magnetic disk, an optical disk, or a flash memory, specifically, as a Hard Disk Drive (HDD), a Solid State Drive (SSD), a Blu-Ray Disc (BD, registered trademark). The control unit 12 can read data from the storage unit 14, or write data to the storage unit 14 as necessary.

The user motion detection unit 121 detects an action or a motion of a user based on outputs from various connected sensors.

The virtual sound source position determination unit 122 determines a position of a virtual sound source from which each sound signal is virtually output based on the detected action or motion of the user.

The sound signal processing unit 123 performs the stereophonic sound processing on each sound signal acquired by the sound signal acquisition unit 11 based on the determined position of each virtual output.

(Sound Signal Reproduction System 2)

Figure 2:
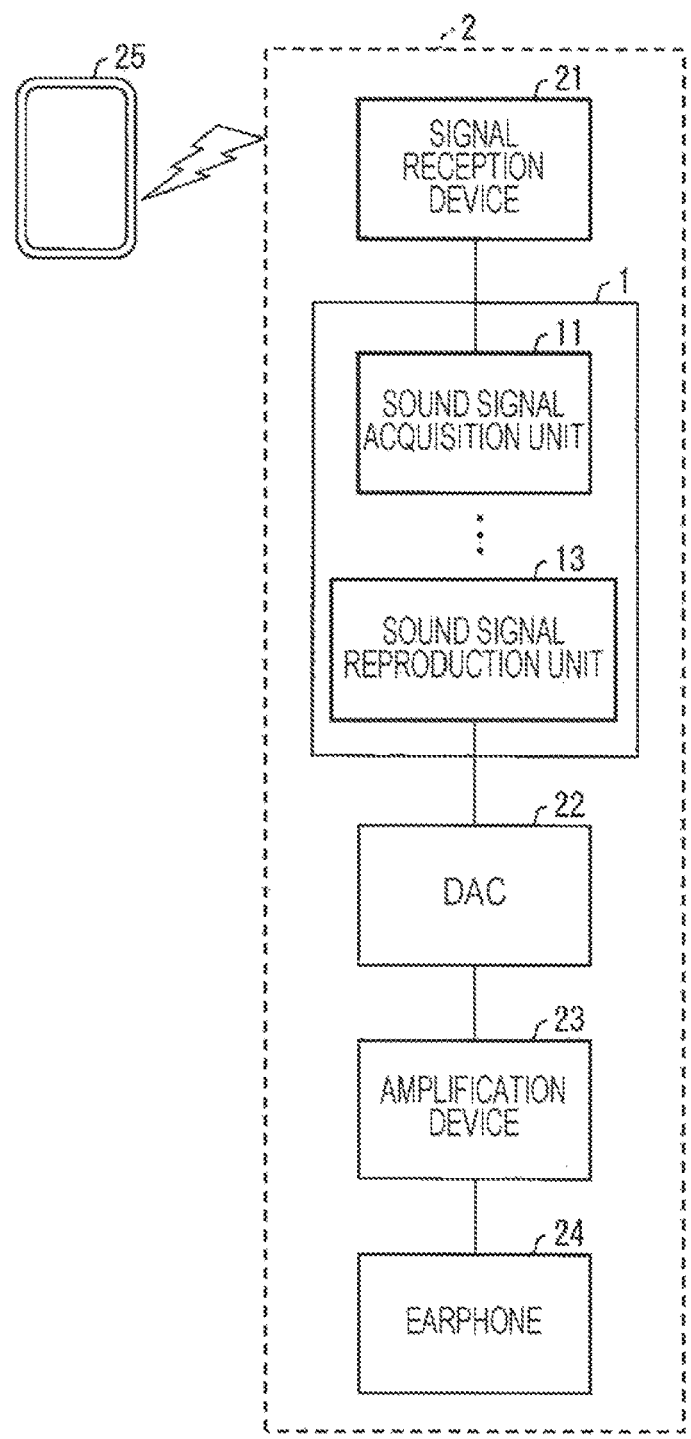
FIG. 2 is a block diagram illustrating a configuration of main parts of a sound signal reproduction system according to the first embodiment of the present invention.

FIG. 2 is a block diagram illustrating a configuration of main parts of a sound signal reproduction system 2 according to the first embodiment of the present invention. As illustrated in the figure, the sound signal reproduction system 2 includes a signal reception device 21, a digital-analog conversion device (DAC) 22, an amplification device 23, and the earphone 24 in addition to the sound signal reproduction device 1.

The signal reception device 21 receives a sound signal from the outside of the sound signal reproduction device 1 by wired communication or wireless communication. As wireless communication, wireless transmission technique such as Bluetooth (registered trademark) or Wireless Fidelity (WiFi, registered trademark) can be used, but it is not limited thereto. As illustrated in FIG. 2, the sound signal acquisition unit 11 receives a sound signal from a portable terminal 25, which is a music player or a smartphone, through the signal reception device 21. For simplicity of explanation, in the present embodiment, the sound signal acquisition unit 11 acquires the sound signal, which is a digital signal, by wireless communication using Bluetooth unless otherwise noted.

A DAC 22 converts the input sound signal of a digital form into a sound signal of an analog form and outputs the analog sound signal to the amplification device 23.

The amplification device 23 amplifies the input sound signal and outputs the amplified sound signal to the earphone 24.

The earphone 24 outputs a sound signal based on the input sound signal.

The user motion detection unit 121 acquires a current motion of a user using the sound signal reproduction device 1 and outputs the acquired motion of the user to the virtual sound source position determination unit 122. The motion of the user notified at this time is used as an index when the virtual sound source position determination unit 122 determines a position of each sound signal.

In the embodiment, the user motion detection unit 121 detects a motion of a user 31 based on outputs from various sensors or systems for detecting the motion of the user 31. The sensor is, for example, an acceleration sensor or a gyro sensor and the system is, for example, a Global Positioning System (GPS), but the sensor and the system are not limited thereto. It is desirable that these sensors are set on a part (preferably the head) of the body of the user for detecting a motion of a user.

In the embodiment, it is assumed that the user motion detection unit 121 detects a motion of the user 31 based on an output of the acceleration sensor not illustrated.

Specifically, when the output of the acceleration sensor is equal to or greater than a predetermined threshold value Th, the user motion detection unit 121 detects (determines) the motion of the user 31 as "movement". On the other hand, when the output of the acceleration sensor is less than the threshold value Th, the user motion detection unit 121 detects (determines) the motion of the user 31 as "standstill". The threshold value Th is stored in advance in the storage unit 14. The motion of the user 31 changes from time to time and the motion of the user 31 notified from the user motion detection unit 121 to the virtual sound source position determination unit 122 is changed to "movement" or "standstill" based on a motion of the user 31 at each occasion.

Based on the motion of the user detected by the user motion detection unit 121, the virtual sound source position determination unit 122 determines a position of each virtual sound source from which a sound represented by each sound signal, acquired by the sound signal acquisition unit 11, is virtually output, and notifies the determined positions to the sound signal processing unit 123. In addition to the detected motion of the user, the virtual sound source position determination unit 122 may determine a position of a virtual sound source in each sound signal based on preconditions (for example, positions and the number of virtual sound sources disposed around the user 31) stored in advance in the storage unit 14.

(Position of Virtual Sound Source)

Figure 3:
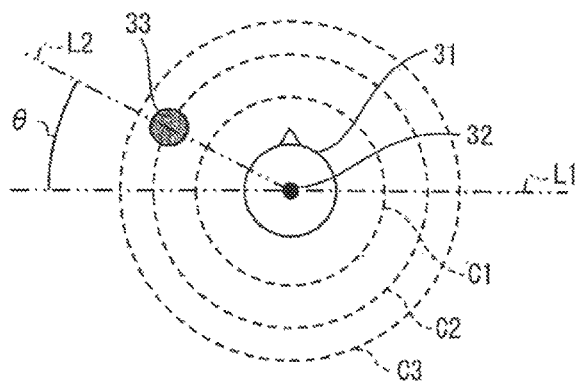
FIG. 3 is a diagram illustrating a relationship between a user and a position of a virtual sound source according to the first embodiment of the present invention.

A position of a virtual sound source will be described in detail with reference to FIG. 3. FIG. 3 is a diagram illustrating a relationship between the user 31 and a position of a virtual sound source 33 according to the first embodiment of the present invention. The user (listener) 31 does not perceive a sound represented by each sound signal as a sound output from a position of an actual sound source (that is, earphone 24). Instead, the user 31 perceives the sound represented by each sound signal as a sound output from a virtual sound source, which is set to each sound signal by the stereophonic sound processing of the sound signal processing unit 123. Hereinafter, a sound source from which a sound represented by each sound signal is virtually output is referred to as "virtual sound source". A position of a virtual sound source is a position relative to the user 31 of the virtual sound source disposed around the user 31.

In the embodiment, a position of a virtual sound source is represented by a predetermined coordinate system with a middle position between the right ear and the left ear of the user 31 as the origin 32. FIG. 3 illustrates the virtual sound source 33 as an example of a virtual sound source. The coordinate system is a two-dimensional polar coordinate system which is configured of a distance (radius vector) r from the origin 32 to the virtual sound source 33 and an angle (deflection angle) θ of the virtual sound source 33 with the origin 32 as a reference unless otherwise noted. That is, the position of the virtual sound source 33 is represented as a combination of the distance r and the angle θ. As illustrated in FIG. 3, the angle θ of the virtual sound source is an angle formed by a straight line L1 passing through the origin 32, and a straight line L2 connecting the origin 32 and the virtual sound source 33.

In the embodiment, for simplicity of explanation, it is assumed that the distance r of the virtual sound source 33 takes any one value of three levels ($r_1$, $r_2$, or $r_3$). The relationship $r_1 < r_2 < r_3$ is satisfied. In the example of FIG. 3, in a case of where the distance of the virtual sound source 33 is $r_1$, the virtual sound source 33 is at any position on the circumference of a circle C1. In a case of where the distance of the virtual sound source 33 is $r_2$, the virtual sound source 33 is at any position on the circumference of a circle C2. In a case of where the distance of the virtual sound source 33 is $r_3$, the virtual sound source 33 is at any position on the circumference of a circle C3.

The sound signal processing unit 123 performs predetermined stereophonic sound processing according to a position of a virtual sound source of each sound signal notified from the virtual sound source position determination unit 122, on each sound signal input from the sound signal acquisition unit 11. Thus, the virtual sound source from which a sound is virtually output from the notified position is set to each sound signal. The sound signal processing unit 123 outputs each sound signal after the processing to the sound signal reproduction unit 13.

Details of the stereophonic sound processing will be described below. The sound signal processing unit 123 converts each sound signal input from the sound signal acquisition unit 11 into each sound signal of the stereophonic sound scheme by employing Head Related Transfer Function (HRTF). Specifically, as illustrated in the following formula (1), N (N is a natural number) pieces of each input signal $I_n(z)$ are multiplied by $HL_n(z)$ and $HR_n(z)$, which are Head Related Transfer Functions (HRTFs), and each input signal $I_n(z)$ after the multiplication is summed up, respectively, thereby summing them to generate a signal for the left ear $L_{OUT}$ and a signal for the right ear $R_{OUT}$.

[Formula 1]

$$L_{OUT} = d\Sigma I_n(z)HL_n(z)$$

$$R_{OUT} = d\Sigma I_n(z)HR_n(z) \quad \text{equation (1)}$$

In equation (1), n=1, 2, ... N. $HL_n(z)$ are HRTFs for the left ear at positions (deflection angles) of virtual sound sources set to the input signals $I_n(z)$, respectively. $HR_n(z)$ are HRTFs for the right ear at positions (deflection angles) of virtual sound sources set to the input signals $I_n(z)$, respectively. In the embodiment, these HRTFs are stored in the storage unit 14 in advance as discrete table information. A coefficient d indicates an attenuation amount based on a distance r from the origin 32 of each virtual sound source and is represented by the following equation (2) in the embodiment.

[Formula 2]

$$d = 1/(r+\varepsilon) \quad \text{equation (2)}$$

In equation (2), r indicates a distance of a virtual sound source from the origin 32 and $\varepsilon$ is a coefficient set in advance.

The sound signal reproduction unit 13 converts the signal for the left ear $L_{OUT}$ and the signal for the right ear $R_{OUT}$ generated by the sound signal processing unit 123, into digital sound signals of an arbitrary sound file form. The sound signal reproduction unit 13 outputs the digital sound signals after the conversion to the outside of the sound signal reproduction device 1 to reproduce. As illustrated in FIG. 2, in a case where the sound signal reproduction device 1 is included in the sound signal reproduction system 2, the sound signal reproduction unit 13 generates digital sound signals of, for example, Inter-IC Sound (I2S) form and outputs the generated signal to the DAC 22.

(Processing Flow)

An example of the flow of sound signal reproduction processing in the sound signal reproduction system 2 will be described below. The sound signal acquisition unit 11 acquires at least one sound signal from the outside (for example, portable terminal 25) of the sound signal reproduction device 1 through the signal reception device 21 and outputs the acquired signal to the virtual sound source position determination unit 122. The user motion detection unit 121 detects a current motion of the user 31 of the sound signal reproduction device 1 and notifies the detection result to the virtual sound source position determination unit 122.

The virtual sound source position determination unit 122 determines a position from which each sound represented by each input sound signal is virtually output based on a notified motion of the user 31. The virtual sound source position determination unit 122 outputs each determined position to the sound signal processing unit 123 in association with each corresponding sound signal.

The sound signal processing unit 123 performs the stereophonic sound processing on each input sound signal based on the position of each virtual sound source determined by the virtual sound source position determination unit 122 to generate the signal for the left ear $L_{OUT}$ and the signal for the right ear $R_{OUT}$, and respectively outputs the generated signals to the sound signal reproduction unit 13. The sound signal reproduction unit 13 converts the input signal for the left ear $L_{OUT}$ and the input signal for the right ear $R_{OUT}$ into digital sound signals of an arbitrary sound file form, and outputs the converted signals to the DAC 22. The DAC 22 converts the input digital sound signals into analog sound signals and outputs the converted signals to the amplification device 23. The amplification device 23 amplifies the input analog sound signals and outputs the amplified signals to the earphone 24. The earphone 24 outputs a sound represented by the input analog sound signals. As a result, the user 31 perceives each sound represented by each sound signal acquired by the sound signal acquisition unit 11 as a sound output from each virtual sound source set to each sound signal.

(Position of Virtual Sound Source 41)

As described above, a position of each virtual sound source is determined based on a motion of the user 31. An example of this will be described below with reference to FIG. 4.

FIG. 4(a) is a diagram illustrating an example of a position of a virtual sound source 41 when the user 31 is stationary according to the first embodiment of the present invention, FIG. 4(b) is a diagram illustrating an example of a position of the virtual sound source 41 when the user 31 is stationary according to the first embodiment of the present invention. In the example of this Fig, the sound signal acquisition unit 11 acquires one sound signal from the outside of the sound signal reproduction device 1.

In FIG. 4(a), since the user 31 is currently stationary, the user motion detection unit 121 detects that a motion of the user 31 is "standstill". In addition, the virtual sound source position determination unit 122 determines a position of one virtual sound source 41 corresponding to the acquired one sound signal as a position $(r_2, \theta_1)$ according to the detected "standstill". As a result, as illustrated in FIG. 4(a), the virtual sound source 41 is disposed at the position $(r_2, \theta_1)$ in front of the user 31.

On the other hand, in FIG. 4(b), since the user 31 is currently moving forward (direction X), the user motion detection unit 121 detects a motion of the user 31 as "movement". In addition, the virtual sound source position determination unit 122 determines a position of one virtual sound source 41 corresponding to the acquired one sound signal as a position $(r_3, \theta_1)$ according to the detected "movement". As a result, as illustrated in FIG. 4(a), the virtual sound source 41 is disposed at the position $(r_3, \theta_1)$ in front of the user 31.

Figure 4:
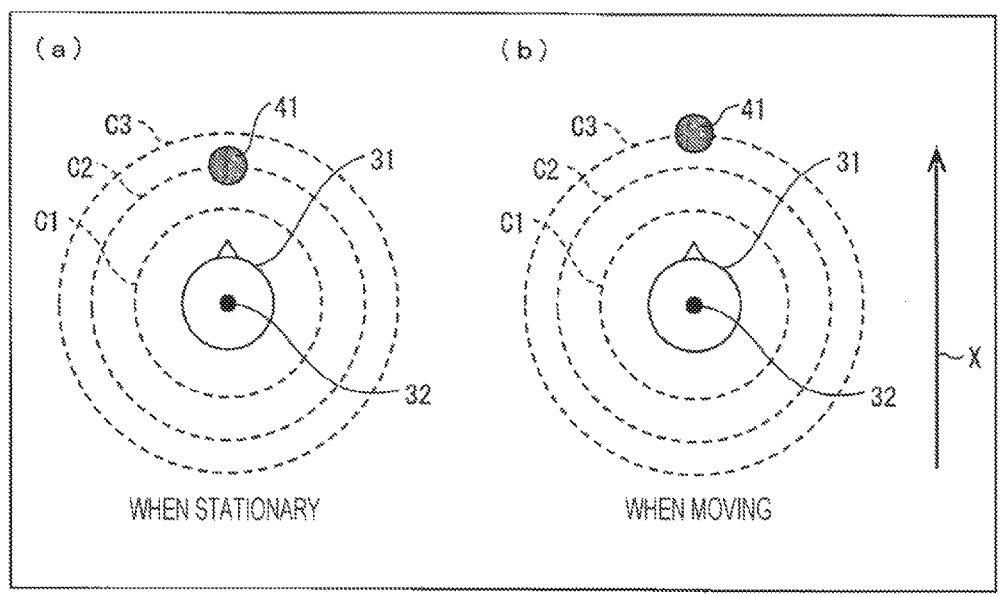
FIG. 4($a$) is a diagram illustrating an example of a position of a virtual sound source when the user is stationary according to the first embodiment of the present invention, FIG. 4($b$) is a diagram illustrating an example of a position of the virtual sound source when the user is stationary according to the first embodiment of the present invention.

In the example of FIG. 4, the virtual sound source position determination unit 122 determines a position of the virtual sound source 41 such that a distance of the virtual sound source 41 in the case where "movement" is detected is made longer than a distance of the virtual sound source 41 in the case where "standstill" is detected. As a result, when the motion of the user 31 changes from "standstill" to "movement", the position of the virtual sound source 41 moves away from the position $(r_2, \theta_1)$ to the position $(r_3, \theta_1)$. At this time, an angle of the virtual sound source 41 remains $\theta_1$, and the distance of the virtual sound source 41 changes from $r_2$ to $r_3$. Thus, the user 31 can hear a sound from a nearer virtual sound source 41 when stationary, but from a farther virtual sound source 41 when moving. This makes it easier to distinguish an ambient sound emitted from the vicinity of the user 31 and the sound output from the virtual sound source 41 when moving, so that the user 31 can more easily hear the ambient sound. Accordingly, the user 31 does not need to stop to confirm the ambient sound during the movement. As a result, the user 31 is not disturbed by the sound output from the virtual sound source 41 of its own action of moving.

In a case where the detected motion of the user 31 is "standstill" or "movement", the position at which the virtual sound source 41 is disposed is determined in advance in the sound signal reproduction device 1. Position information indicating respective positions is stored in the storage unit 14 in advance, and the virtual sound source position determination unit 122 reads and uses the information from the storage unit 14 to determine the position of the virtual sound source 41 according to the motion of the user 31.

The information indicating the position of the virtual sound source 41 may designate the position of the virtual sound source 41 with an absolute value or may indicate it as a relative value. For example, it is assumed that information indicating the position of the virtual sound source 41 in a case where the motion of the user 31 is "movement" is "distance when stationary+α". In this case, the virtual sound source position determination unit 122, with reference to the position $(r_2, \theta_1)$ of the virtual sound source 41 at the "standstill" state illustrated in FIG. 4(a), determines the position of the virtual sound source 41 at the "motion" state as a position $(r_2+\alpha, \theta_1)$ using a coefficient α that satisfies the following equation (3).

[Formula 3]

$$r_3 = r_2 + \alpha \quad \text{equation (3)}$$

(Change of Angle)

In the example of FIG. 4, in a case where the motion of the user 31 changes, only the distance of the virtual sound source 41 changes. However, the present invention is not limited thereto, in the case where the motion of the user 31 changes, only an angle of the virtual sound source may change instead of the distance of the virtual sound source. This example will be described below with reference to FIG. 5.

FIG. 5(a) is a diagram illustrating an example of a position of a virtual sound source 51 when the user 31 is stationary according to the first embodiment of the present invention, FIG. 5(b) is a diagram illustrating an example of a position of the virtual sound source 51 when the user 31 is moving according to the first embodiment of the present invention.

In FIG. 5(a), since the user 31 is stationary, the virtual sound source 51 corresponding to the acquired one sound signal is disposed at a position $(r_2, \theta_1)$ in front of the user 31. On the other hand, in FIG. 5(b), since the user 31 is currently moving forward (direction X), the virtual sound source 51 is disposed at a position $(r_2, \theta_2)$ behind the user 31. At this time, a distance of the virtual sound source 51 remains $r_2$, an angle of the virtual sound source 51 changes from $\theta_1$ to $\theta_2$.

Figure 5:
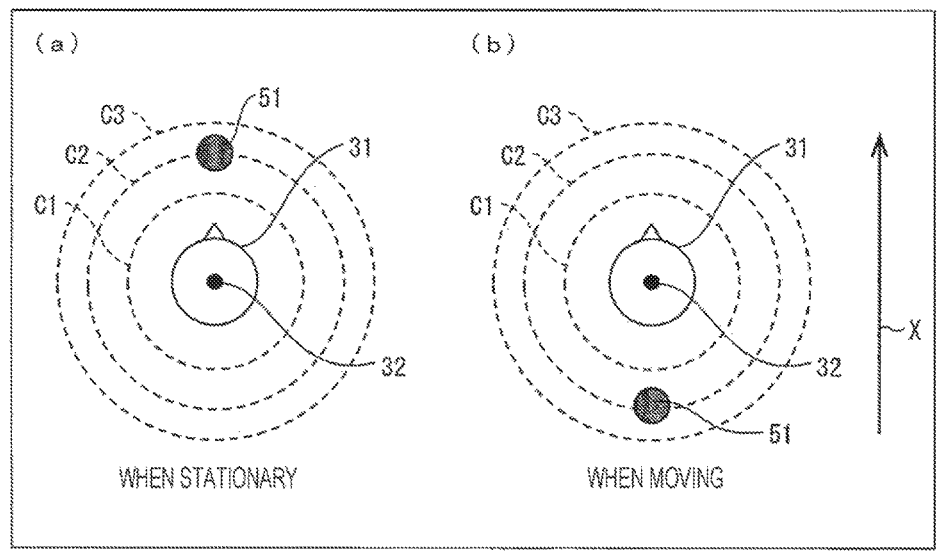
FIG. 5($a$) is a diagram illustrating an example of a position of a virtual sound source when the user is stationary according to the first embodiment of the present invention, FIG. 5($b$) is a diagram illustrating an example of a position of the virtual sound source when the user is moving according to the first embodiment of the present invention.

In the example of FIG. 5, when the motion of the user 31 changes from "standstill" to "movement", the position of the virtual sound source 51 changes from the position $(r_2, \theta_1)$ in front of the user 31 to the position $(r_2, \theta_2)$ behind the user 31. Thus, the user 31 can hear a sound from the virtual sound source 51 in front of the user 31 when stationary, but from the virtual sound source 51 behind the user 31 when moving. This makes that a sound is not emitted from the front of the user 31 when moving, so that it is possible to prevent the user 31 from hesitating to move forward by concerning a sound emitted from the front. As a result, the user 31 is not disturbed by the sound output from the virtual sound source 51 of its own action of moving forward.

(Changes of Distance and Angle)

In a case where the motion of the user 31 changes, both a distance and an angle of a virtual sound source may change. This example will be described below with reference to FIG. 6.

FIG. 6(a) is a diagram illustrating an example of a position of a virtual sound source 61 when the user 31 is stationary according to the first embodiment of the present invention, FIG. 5(b) is a diagram illustrating an example of a position of the virtual sound source 61 when the user 31 is moving according to the first embodiment of the present invention.

In FIG. 6(a), since the user 31 is stationary, the virtual sound source 61 corresponding to the acquired one sound signal is disposed at a position $(r_2, \theta_1)$ in front of the user 31. On the other hand, in FIG. 6(b), since the user 31 is currently moving forward (direction X), the virtual sound source 51 is disposed at a position $(r_3, \theta_2)$ behind the user 31. At this time, a distance of the virtual sound source 51 changes from $r_2$ to $r_3$, an angle of the virtual sound source 51 changes from $\theta_1$ to $\theta_2$.

Figure 6:
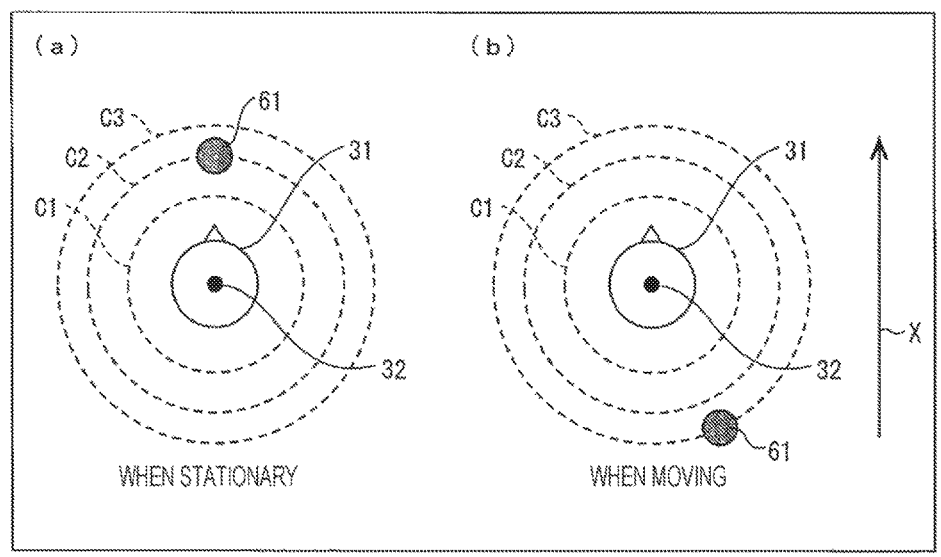
FIG. 6(a) is a diagram illustrating an example of a position of a virtual sound source when the user is stationary according to the first embodiment of the present invention.
FIG. 6(b) is a diagram illustrating an example of a position of the virtual sound source when the user is moving according to the first embodiment of the present invention.
Figure 7:
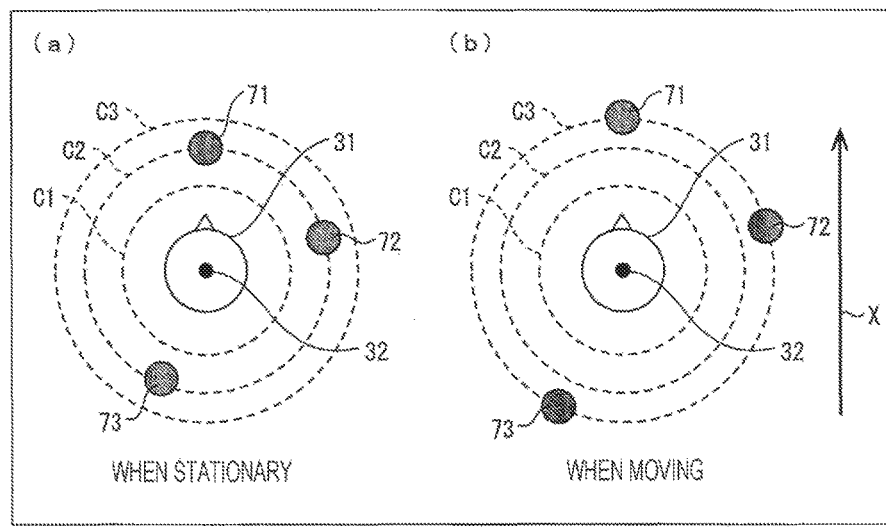
FIG. 7(a) is a diagram illustrating an example of positions of a plurality of virtual sound sources when the user is stationary according to the first embodiment of the present invention.
FIG. 7(b) is a diagram illustrating an example of positions of the plurality of the virtual sound sources when the user is moving according to the first embodiment of the present invention.
Figure 8:
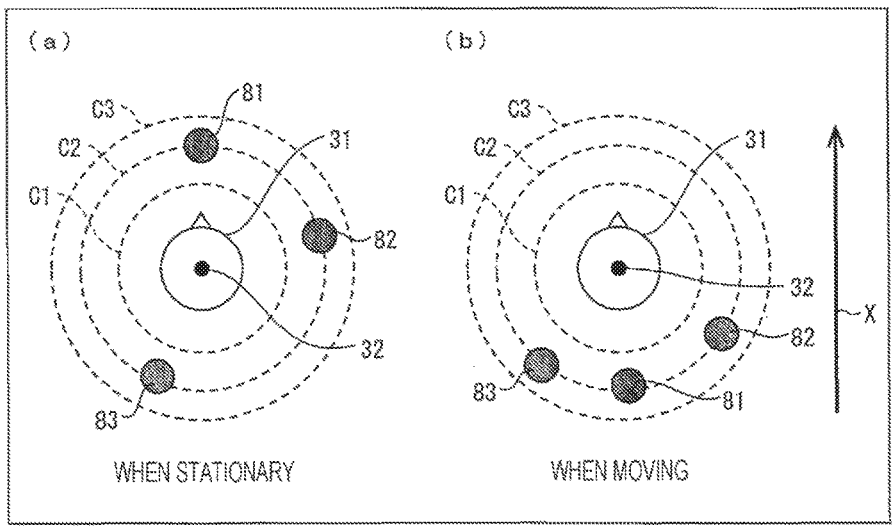
FIG. 8(a) is a diagram illustrating an example of positions of a plurality of virtual sound sources when the user is stationary according to the first embodiment of the present invention.
FIG. 8(b) is a diagram illustrating an example of positions of the plurality of the virtual sound sources when the user is moving according to the first embodiment of the present invention.
Figure 9:
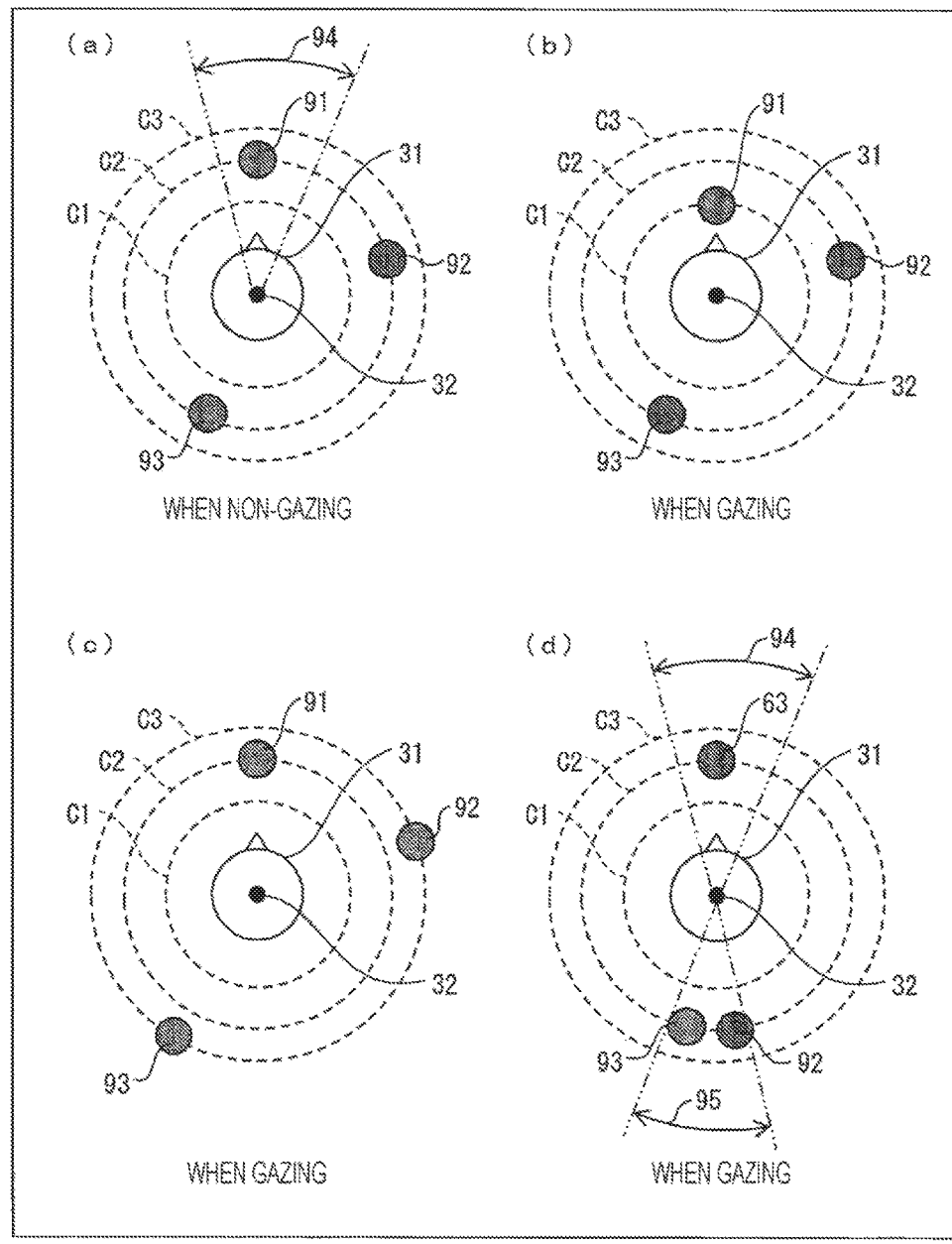
FIG. 9(a) is a diagram illustrating an example of positions of a plurality of virtual sound sources when the user is not gazing at a certain gaze area according to the first embodiment of the present invention.
FIG. 9(b) is a diagram illustrating an example of positions of the plurality of the virtual sound sources when the user is gazing at the gaze area according to the first embodiment of the present invention.
FIG. 9(c) is a diagram illustrating another example of positions of the plurality of the virtual sound sources when the user is gazing at the gaze area according to the first embodiment of the present invention.

As illustrated in FIGS. 4 to 6, the virtual sound source position determination unit 122 can determine the position of the virtual sound source such that at least any one of the distance and the angle from the origin 32 based on the user 31 to the virtual sound source is changed based on the detected motion of the user 31.

(Change of Distance: A Plurality of Virtual Sound Sources)

The sound signal acquisition unit 11 can acquire a plurality of sound signals from the outside of the sound signal reproduction device 1. In this case, a position of each virtual sound source corresponding to each sound signal is respectively detected based on the detected motion of the user 31.

FIG. 7(a) is a diagram illustrating an example of positions of a plurality of virtual sound sources 71 to 73 when the user 31 is stationary according to the first embodiment of the present invention, FIG. 7(b) is a diagram illustrating an example of positions of the plurality of the virtual sound sources 71 to 73 when the user 31 is moving according to the first embodiment of the present invention. Hereinafter, in a case where the motion of the user 31 changes, a case where only the distance of each of the virtual sound sources 71 to 73 changes will be described.

In FIG. 7(a), since the user 31 is stationary, the virtual sound sources 71 to 73 corresponding to the acquired three sound signals are respectively disposed at a position $(r_2, \theta_1)$, a position $(r_2, \theta_2)$, and a position $(r_2, \theta_3)$ around the user 31. On the other hand, in FIG. 7(b), since the user 31 is currently moving forward (direction X), the virtual sound sources 71 to 73 are disposed at a position $(r_3, \theta_1)$, a position $(r_3, \theta_2)$, and a position $(r_3, \theta_3)$ around the user 31. At this time, neither of angles of the virtual sound sources 71 to 73 changes, while all of the distances of the virtual sound sources 71 to 73 change from $r_2$ to $r_3$.

(Changes of Distance and Angle: A Plurality of Virtual Sound Sources)

FIG. 8(a) is a diagram illustrating an example of positions of a plurality of virtual sound sources 81 to 83 when the user 31 is stationary according to the first embodiment of the present invention, FIG. 8(b) is a diagram illustrating an example of positions of the plurality of the virtual sound sources 81 to 83 when the user 31 is moving according to the first embodiment of the present invention. Hereinafter, in a case where the motion of the user 31 changes, a case where both a distance and an angle of each of the virtual sound sources 81 to 83 change will be described.

In FIG. 8(a), since the user 31 is stationary, the virtual sound sources 81 to 83 corresponding to the acquired three sound signals are respectively disposed at a position ($r_2, \theta_1$), a position ($r_2, \theta_2$), and a position ($r_2, \theta_3$) around the user 31. On the other hand, in FIG. 8(b), since the user 31 is currently moving forward (direction X), the virtual sound sources 81 to 83 are disposed at a position ($r_3, \theta_4$), a position ($r_3, \theta_5$), and a position ($r_3, \theta_6$) around the user 31. At this time, all of the distances of the virtual sound sources 71 to 73 change from $r_2$ to $r_3$ and angles of the virtual sound sources 71 to 73 change from $\theta_1$, $\theta_2$, and $\theta_3$ to $\theta_4$, $\theta_5$, and $\theta_6$, respectively.

Modified Embodiment

In the embodiment, the example in which the user motion detection unit 121 detects "standstill" or "movement" as the motion of the user 31, and the virtual sound source position determination unit 122 determines the position of the virtual sound source according to the detected "standstill" or "movement" has been described. However, the processing of the user motion detection unit 121 and the virtual sound source position determination unit 122 is not limited thereto. For example, the user motion detection unit 121 can detect "gaze" indicating that the user 31 is gazing at a certain area or a "non-gaze" indicating that the user 31 is not gazing at the certain area as the motion of the user 31. In this case, the virtual sound source position determination unit 122 determines the position of the virtual sound source as a position based on the detected "gaze" or the detected "non-gaze".

The user motion detection unit 121 detects whether the motion of the user 31 is "gaze" or "non-gaze" based on outputs from various sensors set on the user 31. Specifically, in a case where a gyro sensor is set on the user 31, the user motion detection unit 121 detects "gaze" as the motion of the user 31 in a case where a change of an output (that is, angle) of the gyro sensor for a predetermined unit time $t_1$ is within a predetermined threshold value $Th_1$. On the other hand, in a case where a change of an angle is greater than the threshold value $Th_1$, "non-gaze" is detected as the motion of the user 31.

The user motion detection unit 121, in the case where "gaze" is detected, calculates a gaze area 94 (certain area) at which the user 31 is actually gazing based on the output from the gyro sensor. The detection of "gaze" and the calculated gaze area 94 are notified to the virtual sound source position determination unit 122. The virtual sound source position determination unit 122 determines a position of a virtual sound source 91 such that the position of the virtual sound source 91 located within the gaze area 94 is changed based on the detected "gaze" or the detected "non-gaze". More specifically, the virtual sound source position determination unit 122 determines the position of the virtual sound source 91 such that a distance of the virtual sound source 91 located within the gaze area 94 in the case where the gaze is detected is made shorter than a distance of the virtual sound source 91 located within the gaze area 94 in the case where the non-gaze is detected.

FIG. 9(a) is a diagram illustrating an example of positions of a plurality of virtual sound sources 91 to 93 when the user 31 is not gazing at the certain gaze area 94 according to the first embodiment of the present invention. FIG. 9(b) is a diagram illustrating an example of positions of the plurality of the virtual sound sources 91 to 93 when the user 31 is gazing at the gaze area 94 according to the first embodiment of the present invention. FIG. 9(c) is a diagram illustrating another example of positions of the plurality of the virtual sound sources when the user is gazing at the gaze area according to the first embodiment of the present invention. FIG. 9(d) is a diagram illustrating still another example of positions of the plurality of the virtual sound sources when the user is gazing at the gaze area according to the first embodiment of the present invention.

As illustrated in FIG. 9(a), in a case where the motion of the user 31 is "non-gaze", the three virtual sound sources 91 to 93 are respectively disposed at a position ($r_2, \theta_1$), a position ($r_2, \theta_2$), and a position ($r_2, \theta_3$). Here, it is assumed that the user motion detection unit 121 detects that the user 31 is gazing at the gaze area 94. Thus, the position of the virtual sound source 91 included in the gaze area 94 among the three virtual sound sources 91 to 93 changes to a position ($r_1, \theta_1$) closer to the user 31 as illustrates in FIG. 9(b). On the other hand, the positions of the remained virtual sound sources 92 and 93 are not changed.

Thus, when the user 31 is gazing at the gaze area 94, a sound emitted from the virtual sound source 91 within the gaze area 94 will be heard closer to the user 31 as compared with before the gaze. That is, since the sound from the virtual sound source 91 which the user 31 is currently interested in among the three virtual sound sources 91 to 93 will be heard more greatly, the user 31 can be more satisfied.

The change of the positions of the three virtual sound sources 91 to 93 when gazing is not limited to the example illustrated in FIG. 9(b). In a case where the user motion detection unit 121 detects that the user 31 is gazing at the gaze area 94, the positions of the three virtual sound sources 91 to 93 may be changed to positions illustrated in FIG. 9(c). In the example of FIG. 9(c), the position of the virtual sound source 91 included in the gaze area 94 is not changed, while the positions of the virtual sound sources 92 and 93 are changed to a position ($r_3, \theta_2$) and a position ($r_3, \theta_3$) farther from the user 31.

Thus, when the user 31 is gazing at the gaze area 94, the sound emitted from the virtual sound sources 92 and 93 located outside the gaze area 94 will be heard farther from the user 31 as compared with before the gaze. As a result, since the sound from the virtual sound source 91 which the user 31 is currently interested in among the three virtual sound sources 91 to 93 will relatively be heard more greatly, the user 31 can be more satisfied.

The change of the positions of the three virtual sound sources 91 to 93 when gazing is not limited to the examples illustrated in FIGS. 9(b) and 9(c). In a case where the user motion detection unit 121 detects that the user 31 is gazing at the gaze area 94, the positions of the three virtual sound sources 91 to 93 may be changed to positions illustrated in FIG. 9(d). In the example of FIG. 9(d), the position of the virtual sound source 91 included in the gaze area 94 is not changed, while the positions of the virtual sound sources 92 and 93 are changed to a position ($r_2, \theta_4$) and a position ($r_2, \theta_5$) within an area 95 (another area) located the opposite side of the gaze area 94.

Thus, when the user 31 is gazing at the gaze area 94, the sound emitted from the virtual sound source 91 located within the gaze area 94 will be heard from the front of the user 31, while each sound emitted from the virtual sound sources 92 to 93 located outside the gaze area 94 will be heard from behind of the user 31. As a result, since the sound from the virtual sound source 91 which the user 31 is currently interested in among the three virtual sound sources 91 to 93 will be heard more easily, the user 31 can be more satisfied. The area 95 is not limited to the opposite side of the gaze area 94, and may be an arbitrary area which is different from the gaze area.

The motion of the user 31 detected by the user motion detection unit 121 is not limited to "gaze" and "non-gaze". For example, the user motion detection unit 121 can detect a state in which a user is lying based on both an output from the gyro sensor and an output from the acceleration sensor. In this case, the user motion detection unit 121 detects "sleep" indicating that the user 31 is sleeping as a motion of the user 31, and notifies the detection result to the virtual sound source position determination unit 122. In a case where "sleep" is notified, the virtual sound source position determination unit 122 may determine to lower volume of a sound output from each virtual sound source or to stop outputting the sound from each virtual sound source. As a result, it is possible to prevent the sleep of the user 31 from being disturbed by the sound from each virtual sound source.

In the embodiment, for simplicity of explanation, a case where the motion of the user detected by the virtual sound source position determination unit 122 is two types different from each other has been described, but the present invention is not limited thereto. The motion of the user 31 detected by the virtual sound source position determination unit 122 may be any one of three or more types of motions different from each other.

In the embodiment, the sound signal reproduction system 2 including the sound signal reproduction device 1 that reproduces a sound signal and the earphone 24 that outputs the sound has been described, but the present embodiment is not particularly limited to such a configuration. For example, the sound signal reproduction device 1 can be realized as a player outputs a sound signal to a speaker in a sound system configured by a tuner, a player, and the speaker (each configuration component may be a separate body or may be formed integrally). Alternatively, the sound signal reproduction device 1 can be realized as a single device configured by a sound signal reproduction device (player) capable of performing sound signal processing and a sound output device (for example, speaker or headphone) capable of outputting a sound.

Second Embodiment

Figure 12:
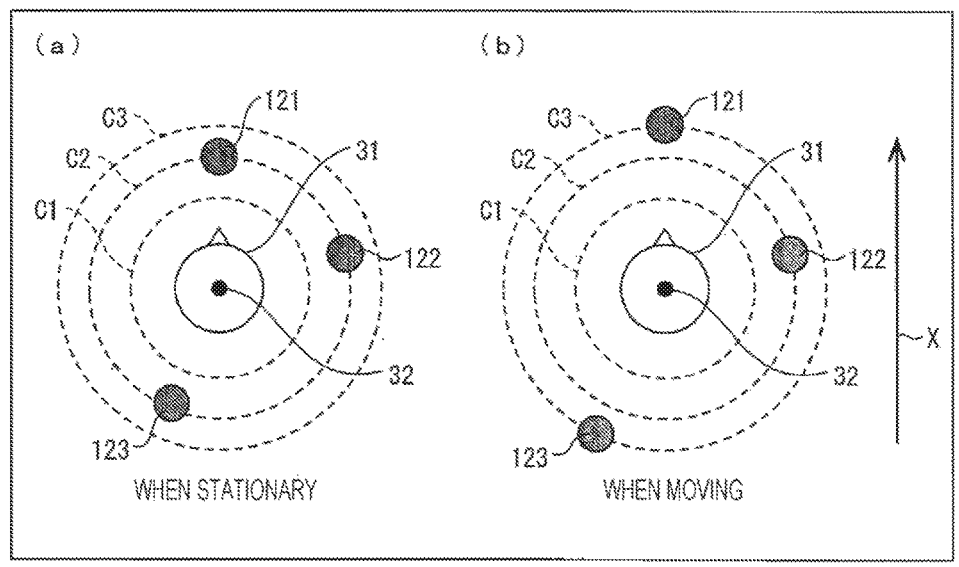
FIG. 12(a) is a diagram illustrating an example of positions of a plurality of virtual sound sources when a user is stationary according to the second embodiment of the present invention.
FIG. 12(b) is a diagram illustrating an example of positions of the plurality of the virtual sound sources when the user is moving according to the second embodiment of the present invention.

A second embodiment of the present invention will be described below with reference to FIGS. 10 to 12. The same reference numerals are assigned to each member common to the above-mentioned first embodiment and a detailed description thereof will be omitted.

In the first embodiment, the example in which the virtual sound source position determination unit 122 determines the position of each virtual sound source only based on the motion of the user 31 detected by the user motion detection unit 121 has been described, but the present invention is not limited thereto. In the embodiment, a case where a virtual sound source position determination unit 122 determines a position of each virtual sound source based on both a detected motion of a user 31 and predetermined data (additional data) added to each sound signal will be described.

(Configuration of Sound Signal Reproduction Device 1a)

The outline of a configuration of a sound signal reproduction device 1a according to the embodiment will be described with reference to FIG. 10. FIG. 10 is a block diagram illustrating a configuration of main parts of the sound signal reproduction device 1a according to the second embodiment of the present invention. As illustrated in the figure, the sound signal reproduction device 1 further includes a metadata acquisition unit 15 (additional data acquisition unit) in addition to each member included in the sound signal reproduction device 1 according to the first embodiment. Accordingly, contents of processing by the virtual sound source position determination unit 122 according to the embodiment is different from the contents of the processing by the virtual sound source position determination unit 122 according to the first embodiment. Since contents of processing by other members such as a sound signal acquisition unit 11 is the same as that in the first embodiment, a detailed description thereof will be omitted.

The metadata acquisition unit 15 acquires the predetermined metadata added to each sound signal acquired by the sound signal acquisition unit 11 and outputs the acquired data to the virtual sound source position determination unit 122. In the embodiment, the metadata acquisition unit 15 acquires the metadata added to each sound signal from the outside of the sound signal reproduction device 1a in addition to the sound signal acquired by the sound signal acquisition unit 11. The metadata acquisition unit 15 can acquire the metadata by either wired communication or wireless communication. On the other hand, in a case where the metadata is stored in a storage unit 14 in advance, the metadata acquisition unit 15 may acquire the metadata from the storage unit 14.

A sound signal and the corresponding metadata may be managed as sound data of an arbitrary sound file form in which these are paired in the outside of the sound signal reproduction device 1a. In this case, a decoder (not illustrated) included in either the sound signal reproduction device 1a or the sound signal reproduction system 2 acquires and appropriately decodes the sound data to separate the sound data into the sound signal and the metadata. The sound signal acquisition unit 11 acquires the sound signal separated from the sound data by the decoder while the metadata acquisition unit 15 acquires the metadata separated from the sound data by the decoder.

(Processing Flow)

Details of processing performed by the sound signal reproduction device 1a according to the embodiment will be described below based on the data flow indicated by each arrow in FIG. 10.

The sound signal acquisition unit 11 acquires at least one sound signal from the outside (for example, portable terminal 25) of the sound signal reproduction device 1 through a signal reception device 21 and outputs the acquired signal to the virtual sound source position determination unit 122. The user motion detection unit 121 detects a current motion of the user 31 of the sound signal reproduction device 1 and notifies the detection result to the virtual sound source position determination unit 122.

The virtual sound source position determination unit 122 determines a position of a virtual sound source from which each sound represented by each input sound signal is virtually output based on the notified motion of the user 31 and the input metadata. In addition, the virtual sound source position determination unit 122 can determine the position of the virtual sound source based on the notified motion of the user 31 and the position information indicating the position of each virtual sound source stored in the storage unit 14 in advance. The virtual sound source position determination unit 122 outputs each determined position to a sound signal processing unit 123 in association with each corresponding sound signal. Since the processing by the sound signal processing unit 123 is the same as that in the first embodiment, a description thereof will be omitted.

Examples of Metadata

FIGS. 11(a) to (c) are diagrams illustrating examples of metadata according to the second embodiment of the present invention. Metadata illustrated in FIG. 11(a) defines whether to allow a change of a position of each of three virtual sound sources. Metadata illustrated in FIG. 11(b) defines the priority of an output from the virtual sound source to the user 31 according to each detected motion (movement or standstill) of the user 31 with respect to each of the three virtual sound sources. Metadata illustrated in FIG. 11(c) defines the position of the virtual sound source according to each detected motion (movement or standstill) of the user 31 as an absolute value on the two-dimensional polar coordinate with respect to each of the three virtual sound sources.

(Position of Virtual Sound Source)

FIG. 12(a) is a diagram illustrating an example of positions of a plurality of virtual sound sources 121 to 123 when the user 31 is stationary according to the second embodiment of the present invention, FIG. 12(b) is a diagram illustrating an example of positions of the plurality of the virtual sound sources 121 to 123 when the user 31 is moving according to the second embodiment of the present invention. In the example of the figure, the sound signal acquisition unit 11 acquires three different sound signals from the outside of the sound signal reproduction device 1a. The metadata acquisition unit 15 acquires the metadata illustrated in FIG. 11(a).

In FIG. 12(a), since the user 31 is currently stationary, the user motion detection unit 121 detects the motion of the user 31 as "standstill". As the positions of the three virtual sound sources in the case where the motion of the user 31 is "standstill", respective pieces of position information indicating a position $(r_2,\theta_1)$, a position $(r_2,\theta_2)$, and $(r_2,\theta_3)$ are stored in the storage unit 14. The virtual sound source position determination unit 122 determines the positions of the three virtual sound sources 121 to 123 corresponding to the acquired three sound signals as the position $(r_2,\theta_1)$, the position $(r_2,\theta_2)$, and $(r_2,\theta_3)$, respectively. Thus, as illustrated in FIG. 12(a), the virtual sound sources 121 to 123 are respectively disposed at the position $(r_2,\theta_1)$, the position $(r_2,\theta_2)$, and $(r_2,\theta_3)$ around the user 31.

In FIG. 12(b), it is assumed that the user 31 starts to move forward (direction X). At this time, the user motion detection unit 121 detects the motion of the user 31 as "movement". As the positions of the three virtual sound sources in the case where the motion of the user 31 is "movement", respective pieces of position information indicating a position $(r_3,\theta_1)$, a position $(r_3,\theta_2)$, and $(r_3,\theta_3)$ are stored in the storage unit 14. The virtual sound source position determination unit 122 determines the positions of the three virtual sound sources 121 to 123 corresponding to the acquired three sound signals as positions according to both the detected "movement" and the metadata illustrated in FIG. 11(a).

Specifically, since it is defined that changes of the positions of the virtual sound source 121 corresponding to a sound source number 1 and the virtual sound source 123 corresponding to a sound source number 3 are allowed in the metadata illustrated in FIG. 11(a), the virtual sound source position determination unit 122 changes the positions of the virtual sound source 121 and the virtual sound source 123 to the position $(r_3,\theta_1)$ and the position $(r_3,\theta_3)$ defined in the position information according to "movement". On the other hand, since it is defined that a change of the position of the virtual sound source 122 corresponding to a sound source number 2 is prohibited in the metadata illustrated in FIG. 11(a), the virtual sound source position determination unit 122 does not change the position of the virtual sound source 122 to the position $(r_3,\theta_2)$ defined in the position information according to "movement", and maintains the position $(r_2,\theta_2)$ according to "standstill". Thus, as illustrated in FIG. 12(b), the virtual sound sources 121 to 123 are respectively disposed at the position $(r_3,\theta_1)$, the position $(r_2,\theta_2)$, and the position $(r_3,\theta_3)$ around the user 31.

As described above, in the embodiment, each virtual sound source is disposed at a position according to the motion of the user 31 and the metadata. Accordingly, it is possible to control the position of each virtual sound source according to the motion of the user 31 in a flexible manner by appropriately changing the contents of the metadata.

Third Embodiment

A third embodiment according to the present invention will be described below with reference to FIG. 13. The same reference numerals are assigned to each member common to the first embodiment or the second embodiment described above and a detailed description thereof will be omitted.

In the first embodiment, the example in which the sound signal acquisition unit 11 acquires the sound signal unrelated to the motion of the user 31 detected by the user motion detection unit 121 has been described, but the present invention is not limited thereto. In the embodiment, an example in which a sound signal acquisition unit 11 acquires an appropriate sound signal according to a detected motion of a user 31 will be described below.

(Configuration of Sound Signal Reproduction Device 1b)

The outline of a configuration of a sound signal reproduction device 1b according to the embodiment will be described with reference to FIG. 13. FIG. 13 is a block diagram illustrating a configuration of main parts of the sound signal reproduction device 1b according to the third embodiment of the present invention. As illustrated in the figure, each member included in the sound signal reproduction device 1b is the same as that included in the sound signal reproduction device 1 according to the first embodiment. However, in the embodiment, contents of processing by the sound signal acquisition unit 11 and a user motion detection unit 121 is different from the contents of the processing by the virtual sound source position determination unit 122 according to the first embodiment. Since contents of processing by other members such as a virtual sound source position determination unit 122 is the same as that in the first embodiment, a detailed description thereof will be omitted.

In the embodiment, the user motion detection unit 121 notifies the detected motion of the user 31 to not only the virtual sound source position determination unit 122, but also the sound signal acquisition unit 11. The sound signal acquisition unit 11 acquires a sound signal according to the notified motion of the user 31 from the outside of the sound signal reproduction device 1b. As described above, the sound signal acquisition unit 11 changes a sound signal acquired from a portable terminal 25 based on the notified motion of the user 31.

In the portable terminal 25, different sound signals according to each motion of the user 31 are prepared in advance. For example, in the portable terminal 25, a sound signal A corresponding to "standstill" and a sound signal corresponding to "movement" are prepared in advance. The sound signal A is a signal which is preferably reproduced when the user 31 is stationary, while the sound signal B is a signal which is preferably reproduced when the user 31 is moving.

In a case where the detected motion of the user 31 is "standstill", the sound signal acquisition unit 11 requests the sound signal A corresponding to "standstill" to the portable terminal 25. The portable terminal 25 provides the sound signal A to the sound signal acquisition unit 11 in response to the request. Thus, the sound signal A which is preferably reproduced when the user 31 is stationary is reproduced when the actual user 31 is stationary. As a result, when the user 31 is stationary, the user 31 perceives a sound suitable for the stationary state as a sound output from a virtual sound source at an appropriate position corresponding to the standstill.

In a case where the detected motion of the user 31 is "movement", the sound signal acquisition unit 11 requests the sound signal B corresponding to "movement" to the portable terminal 25. The portable terminal 25 provides the sound signal B to the sound signal acquisition unit 11 in response to the request. Thus, the sound signal B which is preferably reproduced when the user 31 is moving is reproduced when the actual user 31 is moving. As a result, when the user 31 is moving, the user 31 perceives a sound suitable for the moving state as a sound output from a virtual sound source at an appropriate position corresponding to the movement.

(Processing Flow)

Details of processing performed by the sound signal reproduction device 1b according to the embodiment will be described below based on the data flow indicated by each arrow in FIG. 13.

The user motion detection unit 121 detects a current motion of the user 31 of the sound signal reproduction device 1 and notifies the detection result to the sound signal acquisition unit 11 and the virtual sound source position determination unit 122. The sound signal acquisition unit 11 acquires at least one sound signal according to the notified motion of the user 31 from the outside (for example, portable terminal 25) of the sound signal reproduction device 1 through a signal reception device 21 and outputs the acquired signal to the virtual sound source position determination unit 122.

The virtual sound source position determination unit 122 determines a position of a virtual sound source from which each sound represented by each input sound signal is virtually output based on the notified motion of the user 31. The virtual sound source position determination unit 122 outputs each determined position to a sound signal processing unit 123 in association with each corresponding sound signal. The sound signal processing unit 123 performs stereophonic sound processing according to the determined position on the sound signal.

[Conclusion]

A sound signal reproduction device according to first aspect of the present invention includes an acquisition unit (sound signal acquisition unit 11) that acquires a sound signal indicating a sound, a detection unit (user motion detection unit 121) that detects a motion of a user, a determination unit (virtual sound source position determination unit 122) that determines a position of a virtual sound source from which the sound represented by the acquired sound signal is output based on the detected motion, a processing unit (sound signal processing unit 123) that performs stereophonic sound processing according to the position of the virtual sound source on the acquired sound signal, and a reproduction unit (sound signal reproduction unit 13) that reproduces the sound signal subjected to the stereophonic sound processing.

With the configuration, a virtual sound source is disposed at an appropriate position according to a detected motion of a user. Accordingly, a sound signal reproduction device can reproduce a sound signal such that a sound is output from a position suitable for a motion of a user.

According to the first aspect, in the sound signal reproduction device according to a second aspect of the present invention, the determination unit determines a position of the virtual sound source such that at least any one of a distance from a predetermined origin based on the user to the virtual sound source and an angle of the virtual sound source with respect to the origin is changed based on the detected motion of the user.

With the configuration, a position of a virtual sound source is determined such that at least any one of a distance and an angle of the virtual sound source becomes an appropriate value according to a motion of a user.

According to the second aspect, in the sound signal reproduction device according to a third aspect of the present invention, the detection unit detects a movement indicating that the user is moving or a standstill indicating that the user is stationary as a motion of the user, the determination unit determines a position of the virtual sound source such that a position of the virtual sound source is changed based on the detected movement or the detected standstill.

With the configuration, a virtual sound source is disposed at an appropriate position according to a motion of a user when the user is stationary and moving.

According to the third aspect, in the sound signal reproduction device according to a fourth aspect of the present invention, the determination unit determines a position of the virtual sound source to be behind the user in a case where the movement is detected, and determines a position of the virtual sound source to be in front of the user in a case where the standstill is detected.

With the configuration, a user can hear a sound from a virtual sound source in front of the user when stationary, but from a virtual sound source behind the user when moving. This makes that the sound is not emitted from the front of the user when moving, so that it is possible to prevent the user from hesitating to move forward by concerning the sound emitted from the front. As a result, the user is not disturbed by the sound output from the virtual sound source of its own action of moving forward.

According to the third or fourth aspect, in the sound signal reproduction device according to a fifth aspect of the present invention, determination unit determines a position of the virtual sound source such that the distance of the virtual sound source in the case where the movement is detected is made longer than the distance of the virtual sound source in the case where the standstill is detected.

With the configuration, it becomes easier to distinguish an ambient sound emitted from the vicinity of a user and a sound output from a virtual sound source when moving, so that the user can more easily hear the ambient sound. Accordingly, the user does not need to stop to confirm the ambient sound during the movement. As a result, the user is not disturbed by the sound output from the virtual sound source of its own action of moving.

According to the second aspect, in the sound signal reproduction device according to a sixth aspect of the present invention, the detection unit detects a gaze indicating that the user is gazing at a certain area or a non-gaze indicating that the user is not gazing at the certain area as the motion, the determination unit determines a position of the virtual sound source located within the certain area such that the position of the virtual sound source is changed based on the detected gaze or the detected non-gaze.

With the configuration, a virtual sound source is disposed at an appropriate position according to a motion of a user when the user is gazing and not gazing.

According to the sixth aspect, in the sound signal reproduction device according to a seventh aspect of the present invention, the determination unit determines a position of the virtual sound source such that the distance of the virtual sound source located within the certain area in the case where the gaze is detected is made shorter than the distance of the virtual sound source located within the certain area in the case where the non-gaze is detected.

With the configuration, when a user is gazing at a certain area, a sound emitted from a virtual sound source within the area will be heard closer to the user as compared with before the gaze. That is, since the sound from the virtual sound source which the user is currently interested in will be heard more greatly, the user can be more satisfied.

According to the sixth or seventh aspect, in the sound signal reproduction device according to an eighth aspect of the present invention, the determination unit determines a position of the virtual sound source such that the distance of the virtual sound source located outside the certain area in the case where the gaze is detected is made longer than the distance of the virtual sound source located outside the certain area in the case where the non-gaze is detected.

With the configuration, when a user is gazing at a certain area, the sound emitted from a virtual sound source located outside the area will be heard farther from the user as compared with before the gaze. As a result, since the sound from the virtual sound source which the user is currently interested in will relatively be heard more greatly, the user can be more satisfied.

According to any one of the sixth to eighth aspects, in the sound signal reproduction device according to a ninth aspect of the present invention, the determination unit determines a position of the virtual sound source such that the position of the virtual sound source located outside the certain area in the case where the gaze is detected is moved to another area different from the certain area.

With the configuration, when a user is gazing at a certain area, the sound emitted from a virtual sound source located outside the area will be heard from another area (for example, behind a user) different from the area. As a result, since the sound from the virtual sound source which the user is currently interested in will be heard easier, the user can be more satisfied.

According to any one of the first to ninth aspects, the sound signal reproduction device according to a tenth aspect of the present invention further includes an additional data acquisition unit that acquires predetermined additional data added to the sound signal, the determination unit determines a position of the virtual sound source based on both the detected motion and the acquired additional data.

With the configuration, it is possible to control a position of a virtual sound source according to a motion of a user in a flexible manner by appropriately changing the contents of additional data.

According to any one of the first to tenth aspects, in the sound signal reproduction device according to an eleventh aspect of the present invention, the acquisition unit acquires the sound signal according to the detected motion of the user.

With the configuration, a user can perceive a sound suitable for an action of the user as a sound output from a virtual sound source at an appropriate position according to the action.

A sound signal reproduction method according to a twelfth aspect of the present invention includes an acquisition process of acquiring a sound signal indicating a sound, a detection process of detecting a motion of a user, a determination process of determining a position of a virtual sound source from which the sound represented by the acquired sound signal is output based on the detected motion of the user, a processing process of performing stereophonic sound processing corresponding to the determined position of the virtual sound source on the acquired sound signal, and a reproduction process of reproducing the sound signal subjected to the stereophonic sound processing.

With the configuration, the same operational effects as those of the sound signal reproduction device according to the first aspect are obtained.

The sound signal reproduction device according to each aspect of the present invention may be realized by a computer. In this case, by causing the computer to operate as each unit included in the sound signal reproduction device, the scope of the present invention also includes a control program of a sound signal reproduction device that causes the computer to realize the sound signal reproduction device, and a computer-readable recording medium that records the program.

Implementation Example by Software

Each functional block of the sound signal reproduction device 1 illustrated in FIG. 1 may be realized by a logic circuit (hardware) formed by an integrated circuit (IC chip) or the like, may be realized by software using a Central Processing Unit (CPU).

In the latter case, the sound signal reproduction device 1 includes a CPU that executes an instruction of a program which is software realizing each block, a Read Only Memory (ROM) or a recording medium (these are referred to as "recording medium") in which the program and various data are recorded in a readable manner by the computer (or CPU), and a Random Access Memory (RAM) that develops the program and the like. The computer (or CPU) reads and executes the program from the recording medium to achieve the object of the present invention.

As the recording medium, "non-transitory tangible medium" such as a tape, a disk, a card, a semiconductor memory, or a programmable logic circuit can be used. The program may be provided to the computer through an arbitrary transmission medium (for example, communication network or broadcast wave) capable of transmitting the program. The present invention can also be realized in a data signal form embedded in a carrier wave, in which the program is embodied by electronic transmission.

Figure 10:
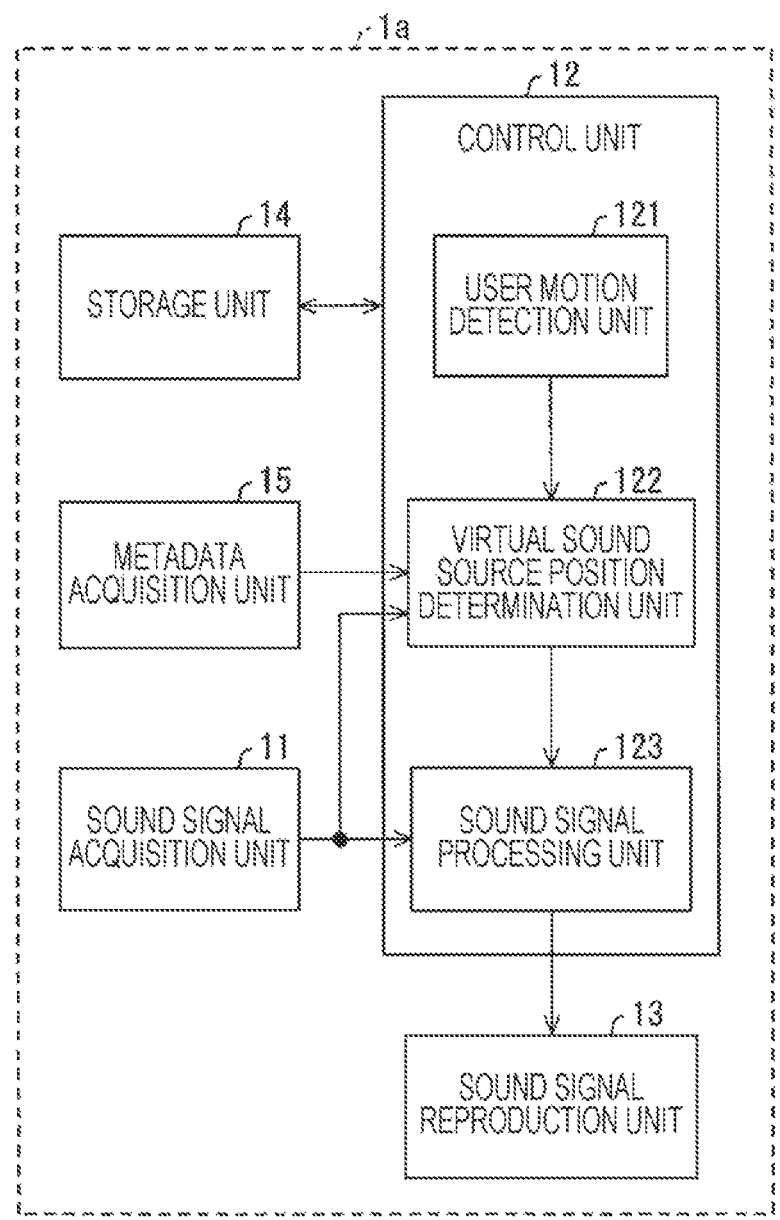
FIG. 10 is a block diagram illustrating a configuration of main parts of a sound signal reproduction device according to a second embodiment of the present invention.
Figure 13:
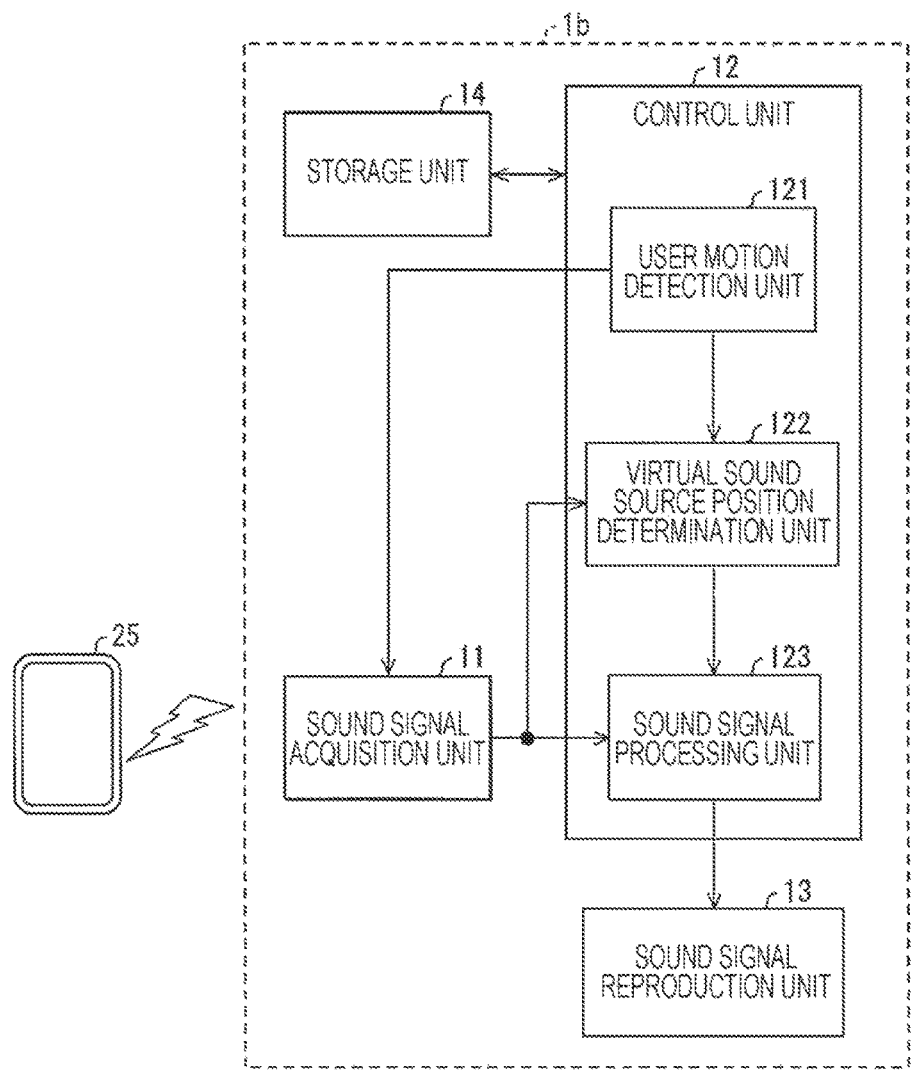
FIG. 13 is a block diagram illustrating a configuration of main parts of a sound signal reproduction device according to a third embodiment of the present invention.

Similarly, the sound signal reproduction device 1a illustrated in FIG. 10 and the sound signal reproduction device 1b illustrated in FIG. 13 can also be realized by either hardware or software.

The present invention is not limited to each of the embodiments described above, and various modifications are possible within the scope indicated in the aspects. Embodiments obtained by appropriately combining the technical measures respectively disclosed in different embodiments are also included in the technical scope of the present invention. Further, new technical features can be formed by combining the technical measures respectively disclosed in each of the embodiments.

INDUSTRIAL APPLICABILITY

The present invention can suitably be used as various portable music players, sound systems, or the like.

REFERENCE SIGNS LIST

1, 1a, 1b sound signal reproduction device
2 sound signal reproduction system 11 sound signal acquisition unit (acquisition unit)
12 control unit
14 storage unit
15 metadata acquisition unit (additional data acquisition unit)
121 user motion detection unit (detection unit)
122 virtual sound source position determination unit (determination unit)
123 sound signal processing unit (processing unit)
22 DAC
23 amplification device
24 earphone

The invention claimed is:

1. A sound signal reproduction device comprising:
an acquisition circuitry that acquires a sound signal;
a detection circuitry that detects, as a motion of a user, whether or not the user is moving;
a determination circuitry that determines a position of a virtual sound source from which a sound represented by the acquired sound signal is output based on the detected motion; and
a reproduction circuitry that reproduces a sound signal subjected to sound processing in accordance with the determined position of the virtual sound source
wherein the determination circuitry determines the position of the virtual sound source:
(i) to be behind the user in a case where the detection circuitry detects that the user is moving, and to be in front of the user in a case where the detection circuitry detects that the user is not moving, or
(ii) to be away from the user in the case where the detection circuitry detects that the user is moving, as compared with the case where the detection circuitry detects that the user is not moving.

2. A sound signal reproduction device comprising:
an acquisition circuitry that acquires a sound signal;
a detection circuitry that detects, as a motion of a user, a gaze indicating that the user is facing a certain direction or a non-gaze;
a determination circuitry that determines a position of a virtual sound source from which a sound represented by the acquired sound signal is output based on the detected motion; and
a reproduction circuitry that reproduces a sound signal subjected to sound processing in accordance with the determined position of the virtual sound source
wherein the determination circuitry determines the position of the virtual sound source:
(i) to be located within a certain area so as to be away from the user in a case where the detection circuitry detects the gaze, as compared with a case where the detection circuitry detects the non-gaze, or
(ii) to be located outside the certain area so as to be away from the user in the case where the detection circuitry detects the gaze, as compared with the case where the detection circuitry detects the non-gaze.

3. The sound signal reproduction device according to claim 2,
wherein the determination circuitry determines the position of the virtual sound source when gaze is detected and the position of the virtual sound source located outside a certain area is moved to another area different from the certain area.

4. The sound signal reproduction device according to claim 1, further comprising:
an additional data acquisition circuitry that acquires predetermined additional data to be added to the sound signal,
wherein the determination circuitry determines the position of the virtual sound source based on both the detected motion and the acquired additional data.

5. A sound signal reproduction device comprising:
an acquisition circuitry that acquires a sound signal;
a detection circuitry that detects, as a motion of a user, whether or not the user is moving;
a determination circuitry that determines a position of a virtual sound source from which a sound represented by the acquired sound signal is output based on the detected motion; and
a reproduction circuitry that reproduces a sound signal subjected to sound processing in accordance with the determined position of the virtual sound source,
wherein the detection circuitry further detects whether or not the user is lying, and
wherein in a case where the detection circuitry detects a state in which the user is lying, the determination circuitry determines to lower volume of a sound output from the virtual sound source or to stop outputting the sound from the virtual sound source.

* * * * *